United States Patent [19]

Eglise et al.

[11] Patent Number: 4,674,618
[45] Date of Patent: Jun. 23, 1987

[54] TOKENS AND TOKEN HANDLING DEVICES

[75] Inventors: David Eglise, Windsor; Adrian Lewis, Lymington, both of England

[73] Assignee: Mars Incorporated, McLean, Va.

[21] Appl. No.: 678,509

[22] Filed: Dec. 5, 1984

[30] Foreign Application Priority Data

Dec. 6, 1983 [GB] United Kingdom ............... 8332443
Oct. 4, 1984 [GB] United Kingdom ............... 8425079

[51] Int. Cl.$^4$ .............................................. G07F 7/10
[52] U.S. Cl. .................................. 194/210; 194/205;
194/214; 194/346; 340/825.35; 235/381;
235/487
[58] Field of Search ............. 194/4 E, 4 C, 4 F, 4 G,
194/4 D, 1 R, 4 R, 1 K, 4 B, 205, 210, 214, 212,
346, 213; 235/380, 381, 487; 340/825.35,
825.34; 364/479

[56] References Cited

U.S. PATENT DOCUMENTS

| | | |
|---|---|---|
| 2,073,392 | 3/1937 | Knee .................................. 194/97 A |
| 2,177,689 | 10/1939 | Dalkin .................................. 194/46 |
| 2,977,024 | 3/1961 | Harris . |
| 3,087,018 | 4/1963 | Pferd . |
| 3,169,168 | 2/1965 | Capranica . |
| 3,171,020 | 2/1965 | Lord . |
| 3,211,267 | 10/1965 | Bayha . |
| 3,237,058 | 2/1966 | Andregg . |
| 3,637,994 | 1/1972 | Ellingbog . |
| 3,774,205 | 11/1973 | Smith et al. . |
| 3,870,866 | 3/1975 | Halpern . |
| 3,906,460 | 9/1975 | Halpern . |
| 3,911,252 | 10/1975 | Meyer . |
| 3,971,916 | 7/1976 | Moreno . |
| 4,068,232 | 1/1978 | Meyers et al. . |
| 4,075,631 | 2/1978 | Dumez . |
| 4,179,064 | 12/1979 | Yoshioka et al. .................... 235/381 |
| 4,185,730 | 1/1980 | Roes et al. . |
| 4,247,758 | 1/1981 | Rodrian . |
| 4,303,904 | 12/1981 | Chasek . |
| 4,333,072 | 6/1982 | Beigel . |
| 4,384,288 | 5/1983 | Walton ........................... 235/380 X |
| 4,388,524 | 6/1983 | Walton ............................... 235/380 |
| 4,473,825 | 9/1984 | Walton ........................... 235/380 X |
| 4,580,041 | 4/1986 | Walton . |

FOREIGN PATENT DOCUMENTS

| | | |
|---|---|---|
| 0029560 | 6/1981 | European Pat. Off. . |
| 0035692 | 9/1981 | European Pat. Off. . |
| 0040544 | 11/1981 | European Pat. Off. . |
| 0041261 | 12/1981 | European Pat. Off. . |
| 0071311 | 2/1983 | European Pat. Off. . |
| 0075351 | 3/1983 | European Pat. Off. . |
| 0080233 | 6/1983 | European Pat. Off. . |
| 0094716 | 11/1983 | European Pat. Off. . |
| 0107061 | 5/1984 | European Pat. Off. . |
| 2748584 | 5/1978 | Fed. Rep. of Germany . |
| 2657182 | 6/1978 | Fed. Rep. of Germany . |
| 3149789 | 8/1983 | Fed. Rep. of Germany . |
| 3207405 | 9/1983 | Fed. Rep. of Germany . |

(List continued on next page.)

Primary Examiner—Robert J. Spar
Assistant Examiner—P. McCoy Smith
Attorney, Agent, or Firm—Davis Hoxie Faithfull & Hapgood

[57] ABSTRACT

A token handling device transmits, using an electromagnetic carrier, data, clock pulses and power to a token. The token transmits data by varying the degree of absorbtion of the carrier in synchronism with the clock pulses. These data transmissions are detected by a receiver in the token handling device, the sensitivity of which is adjusted each time a token is received. The token could be used in transactions in place of coins, or alternatively could be used for identification in other areas. Data stored by the token could be used to change the way in which the token handling device operates. The token handling device may for example form a vending machine, and the token could be used to alter the pricing of goods vended thereby. The token handling device may be combined with a coin validator, in which case there is preferably a common path from an entrance slot for carrying both the tokens and the coins to appropriate testing apparatus.

45 Claims, 10 Drawing Figures

FOREIGN PATENT DOCUMENTS

| Number | Date | Country |
|---|---|---|
| 2325251 | 4/1977 | France . |
| 2410856 | 6/1979 | France . |
| 2527870 | 12/1983 | France . |
| 973675 | 10/1964 | United Kingdom . |
| 1129761 | 10/1968 | United Kingdom . |
| 1187130 | 4/1970 | United Kingdom . |
| 1314021 | 4/1973 | United Kingdom . |
| 1427920 | 3/1976 | United Kingdom . |
| 1504516 | 3/1978 | United Kingdom . |
| 1505715 | 3/1978 | United Kingdom . |
| 1507050 | 4/1978 | United Kingdom . |
| 1538157 | 1/1979 | United Kingdom . |
| 1555606 | 1/1979 | United Kingdom . |
| 1543601 | 4/1979 | United Kingdom . |
| 1543602 | 4/1979 | United Kingdom . |
| 2017454 | 10/1979 | United Kingdom . |
| 2018484 | 10/1979 | United Kingdom . |
| 1567750 | 5/1980 | United Kingdom . |
| 2034558 | 6/1980 | United Kingdom . |
| 1577920 | 10/1980 | United Kingdom . |
| 2057740 | 4/1981 | United Kingdom . |
| 2066535 | 7/1981 | United Kingdom . |
| 1599120 | 9/1981 | United Kingdom . |
| 2075732 | 11/1981 | United Kingdom . |
| 2077556 | 12/1981 | United Kingdom . |
| 2081950 | 2/1982 | United Kingdom . |
| 2082816 | 3/1982 | United Kingdom . |
| 2092343 | 8/1982 | United Kingdom . |
| 2092344 | 8/1982 | United Kingdom . |
| 2092345 | 8/1982 | United Kingdom . |
| 2092353 | 8/1982 | United Kingdom . |
| 2102250 | 1/1983 | United Kingdom . |
| 2110862 | 6/1983 | United Kingdom . |
| 2130412 | 5/1984 | United Kingdom . |
| 1595377 | 8/1987 | United Kingdom . |

TOKENS AND TOKEN HANDLING DEVICES

This invention relates to tokens and token handling devices.

The invention is particularly, although not exclusively, useful in the field of vending machines, gaming machines, amusement machines, pay telephones, change-giving apparatus and like machines which dispense something of value or perform a service or function in exchange for money received from the user. Such machines will for convenience be referred to herein as coin operated machines. These machines generally handle a large volume of coins, which means that the machines need to have a large storage space for the coins, that the coins need to be regularly collected and transported to a central location, and that they then need to be counted and delivered to a bank. This procedure is inconvenient and expensive for the owner of the machine. In addition, the user has to have coins available in order to use the machine, and would therefore need to carry an inconveniently large number of coins if he wished to use the machine often. He would have to have the correct denominations of coins available unless the machine was of the change-giving type, and in the latter case carrying the change around would be inconvenient.

Some of the machines referred to above, for example gaming machines, have been capable of handling special tokens in addition to genuine coins. However these tokens have generally been treated in much the same way as genuine coins.

The present invention is concerned with arrangements which can substantially mitigate the disadvantages referred to above by arranging for the machines to be able to handle, in place of or preferably in addition to genuine coins, data-storing tokens which can be used to authorise transactions of different values, and which are preferably returned by the machine so that the tokens can be repeatedly used. Two types of system could be used: a debit system in which a user makes an initial payment for a token which stores therein data representing its value, the machine being operable to alter this stored data upon use of the token so as to reduce the value by an amount corresponding to the value of the transaction; and a credit system in which the token stores data representing an account of the user, the machine being operable upon use of the token to note this account data so that the account can then be debited by an amount corresponding to the value of the transaction. In the latter case, the machine could be connected on-line to a central station which keeps the account information, or could store information which is regularly collected by means of data storage modules.

Allowing the user to operate the machine using a "debit" or "credit" token effectively avoids the problems referred to above relating to the handling and carrying of large numbers of coins.

It will be appreciated, however, that aspects of the invention have value in other fields. For example, the invention is also useful in the field of identification tags, wherein for example data-storing tokens could be used with automatic equipment for gaining access to areas restricted to authorised personnel.

A first specific aspect of the invention relates to a device which handles both coins and tokens storing data which can be determined upon communication between the device and the token, the device having a common path for receiving the coins and the tokens and for delivering them to testing apparatus for validating the coins and communicating with the tokens.

The use of a common path has the advantage that the user can operate the machine using tokens in the same way as the machine is operated using coins, e.g. by inserting tokens and coins through the same slot. This feature also has the substantial advantage that, because it is not necessary to provide a separate entrance slot and path for the tokens, modifying the vast number of existing machines already in use so that they can additionally handle tokens is rendered much more simple.

The testing apparatus is preferably arranged to have two separate testing stations, one for validating the coins and the other for communicating with the tokens, the arrangement being such that only those items which are rejected by the first testing station are delivered to the second testing station.

It is preferred that the coin validator be the first testing station. This permits existing coin operated machines to be adapted to handle tokens without requiring any physical modification to the coin handling mechanism up to and including the coin validator. Instead, it is merely necessary to install the test station for the tokens along the path taken by items rejected by the coin validator. This feature is particularly useful in that it is very common for coin mechanisms incorporating a coin validator and a separator for separating rejected items and genuine coins to form a unit, and for the same type of unit to be installed in different kinds of coin operated machines. In these circumstances, the coin path leading to the validator may vary substantially depending upon the machine in which the coin mechanism is installed. If the token interrogation station were to be installed in front of the coin validator, in some cases there may be insufficient room in the vending machine to permit this modification without substantially changing the configuration of the coin mechanism itself. This is avoided in the preferred embodiment by installing the token testing station within the unit and along the reject path.

It is envisaged that in most public installations, the majority of items inserted into the device will be genuine coins, and that very few items which are neither genuine coins nor tokens will be inserted. Thus, by arranging for coin validation to occur first, the majority of items delivered to each testing station will be appropriate for that station, so that the device operates in an efficient manner.

The device preferably has means for temporarily retaining the tokens within the device until a transaction is completed. If the token is a debit token, this feature is desired to enable the value stored in the token to be altered by an amount corresponding to the value of the transaction before being returned to the user. If the token is a credit token, this feature is desirable, particularly in "multi-vend" machines which can be operated a number of times in succession without requiring the user repeatedly to insert coins or tokens, because retrieving the token would be a convenient way of signifying the end of a transaction or a series of transactions. A credit token could instead be returned immediately to the user after interrogation, but this means that the user would then have to perform some operation to advise the machine when his transactions are completed, and if he were to forget to do this the values of subsequent transactions carried out by other users would be deducted from his account.

The holding station at which the token is temporarily retained is preferably, like the token testing station, disposed after the validator and more preferably after separation by an accept/reject gate so that the station receives only those items which are rejected by the validator. In a particularly convenient embodiment, the token testing station and holding station are combined. This has the advantage that communication with the token can be carried out after the token has been halted at the holding station.

The device preferably also has means for updating or otherwise altering the data in the token, or introducing new data into the token, which in the debit system would be used to alter the token's value after a transaction has been carried out. The means for accomplishing this is preferably also disposed at the holding station, although in an alternative embodiment it could be disposed downstream of the holding station so as to update the data during the token's exit from the machine.

Preferably, means for obtaining data from the tokens and means for updating information in the tokens are both disposed at the holding station. The two functions may be performed using common components.

According to a second specific aspect of the invention, a token storing alterable data which can be determined by communication with the token is substantially coin-shaped and sized. The token is such that it can enter and pass through a standard coin handling mechanism. This has a number of advantages. It means that modifying existing coin operated machines so that they can additionally handle the tokens is rendered much easier, because it merely involves fitting a means for communicating with the token to otherwise fairly standard equipment. For example, as described above, a testing station can be disposed along a reject path of the mechanism, so that the token passes through the validator, is rejected and then reaches the testing station. This aspect of the invention also has the advantage that even if machines are intended to be used only with tokens, and not with genuine coins, it is nevertheless possible to use standard coin handling mechanisms and techniques.

The token may contain its own power supply, but preferably is powered by energy transmitted by the token handling device.

The tokens used in the various aspects of the present invention are preferably arranged so that they and the device can communicate in a "contactless" manner. Various techniques can be used. For example, very low frequency radio transmission can be used to obtain data from, and if desired to pass data to, the token. British Patent Specifications Nos. 1,599,120 and 2,077,556A describe radio techniques for interrogation. Other methods, e.g. optical techniques, could alternatively be used.

One alternative technique, which is considered particularly advantageous, forms the subject of a third aspect of the present invention. In accordance with this aspect, a token handling device, referred to also as a token interrogator, has means for communicating with a token by determining how an electromagnetic field is absorbed by the token. The invention also extends to a token suitable for use with such a device. The token preferably has a field-absorbing circuit which can be controlled so as to alter the degree or nature of the absorption.

In one embodiment described herein, this is a resonant circuit whose resonant frequency can be switched between at least two values. The device may communicate with the token by generating an electromagnetic field of different frequencies, and more preferably of a continuously-swept frequency. The device determines data stored in the token in accordance with the frequencies at which absorption of the field occurs. Preferably, the device determines the data in response to changes in the absorption frequency, so that it operates substantially independently of the specific resonance frequencies of the resonant circuit.

An alternative, preferred arrangement is also described herein. In this arrangement, the token is powered by an electromagnetic signal transmitted by the interrogator (preferably of a frequency around 100 kHz). The same signal as is used for transmitting power is also used for communication between the token and the interrogator. Data is communicated to the token by selectively interrupting the power transmissions for brief periods. The token has power storing means so that these interruptions do not interfere with its operation. The token sends data to the interrogator by selectively coupling a low impedance across its receiving antenna. This alters the degree of energy absorption, which can be sensed by the interrogator. The data transmissions are preferably made at predetermined times, and to facilitate this a clock signal is preferably used. Preferably, the interrogator transmits clock pulses in the same way as data pulses, and these clock pulses are used both for transmissions to the token and transmissions from the token.

In addition, in this arrangement, the token contains a non-volatile readable and writable memory (preferably an EAROM). This is desirably used for storing operational data such as the token value, but also has another use. In particular, it may be desirable in many circumstances to terminate the power transmission to the token before all the operations involving the token have been completed. This for example may be useful for reducing power consumption when the token is used in a pay phone installation; the token may be interrogated when first inserted to check its validity, whereupon the power is cut off for the duration of the telephone call and thereafter reapplied to allow the token value to be reduced by an amount corresponding to the cost of the telephone call. Thus, on powering-up of the token, either of two sequences of operations of the token could be required (i.e. transmission of data to the interrogator, or receipt of data from the interrogator). The non-volatile memory in the token can be used to store a flag which indicates which part of the complete cycle of operations the token is in, and which is used to determine what actions are taken by the token upon powering-up. This arrangement embodies a number of further independently inventive aspects, amongst which are:

(a) A system comprising a token which receives power from an antenna and sends data by altering the impedance across the antenna (preferably by shorting-out or at least connecting a very low impedance across the antenna).

(b) A token and interrogator between which two-way communication can be established using the same carrier signal, which signal originates from the interrogator (and preferably transmits power and/or clock pulses to the token).

(c) A token and interrogator between which two-way communication can be established, communication in both directions being synchronized with clock pulses transmitted by the interrogator.

(d) A system comprising a token powered by energy received from the interrogator, the token having a non-volatile writable memory and being arranged to perform, following power-up, one of a plurality of sequences of operations dependent upon flag data stored in the memory, at least one of those sequences resulting in a change in that flag data.

It will be appreciated that these aspects of the invention reside in the token and interrogator individually, as well as the combination thereof.

The token handling device may have transmission and reception coils for transmitting and receiving the signal which is selectively absorbed by the token. Alternatively, a single coil could be used for both these purposes.

In accordance with a still further aspect of the invention a token handling device is arranged for automatically altering its sensitivity to received transmissions in the presence of a token, and preferably each time a new token is received by the handling device. The transmission carrier could originate at the token, but this aspect is particularly useful when the token transmits data by altering the degree by which it absorbs a carrier transmitted from a different source, and also when the token is powered by received electromagnetic energy, because in those circumstances the signals received by the token handling device may vary due to slight differences in the tokens, or slightly different positions of the tokens. This can be compensated for by adapting the receiver sensitivity to ensure that changes in absorption of the carrier transmitted by the token handling device are correctly received by the token handling device.

The device is preferably able to communicate with the token irrespective of the particular orientation of the token.

According to a further specific aspect of the invention, there is provided a token handling device which performs operations in accordance with operational data stored in the device, and which is capable of communicating with a token in order to determine token data stored thereby, the device being operable to enter a first mode or a second mode in dependence upon the token data, the device being operable in the first mode to perform a said operation, and in the second mode to alter the operational data in a manner dependent upon said token data.

It is envisaged that the device would normally be caused by entered tokens to perform operations (such as permitting access to certain areas, or in the case of vending machines and the like vending a product or performing a service), but could also have its operational parameters altered by entering a special token storing predetermined data. This would be useful for example if a vending machine owner wished to change the pricing data stored in his vending machines. He would have a specially encoded token which would cause this to occur upon insertion into the vending machine, so that the pricing change could be achieved as easily, and using the same electronic components, as when using a token to purchase a product from the machine.

In the field of identification tokens, which may store a special code which when read out by the device permits access to a particular area, it may be desired for security reasons to change the code which authorises access. This could be achieved very easily by using a specially encoded token which stores data such as to cause the device to enter the second mode, in which information in the token is used to change a stored parameter so that in future the device will recognise a different security code as being appropriate for authorising access.

According to another specific aspect of the invention, there is provided a token handling device operable to receive and communicate with tokens in order to determine data stored thereby, and operable to perform a transaction and to alter the data stored by the token in accordance with a predetermined value associated with the transaction, the device being operable before performing the transaction to carry out a security code recognition operation to determine whether the token stores a security code which is appropriate to that machine, and to carry out the transaction only if the token stores such an appropriate security code.

Thus, vending machines, and like machines for dispensing products or performing services, can be designed so that they will accept tokens issued by a particular company, for example that owning the vending machines, but will not accept tokens issued by other companies, which tokens may be identical except for the security code stored therein. In this way, an owner of a chain of vending machines can ensure that he is paid for all the tokens used to obtain products from his machines.

Preferably, the token handling device itself must store a security code which is appropriate for the token in order for transactions to be carried out. In this way, it can be ensured that a company's tokens will not have their values altered in an unauthorised manner by insertion into another company's token handling device.

The token handling device may be arranged additionally to handle genuine coins.

In a preferred embodiment of the invention, aspects described above are combined to produce a token handling system of substantial advantage and utility.

Arrangements embodying the invention will now be described by way of example with reference to the accompanying drawings, in which.

Figure 3:
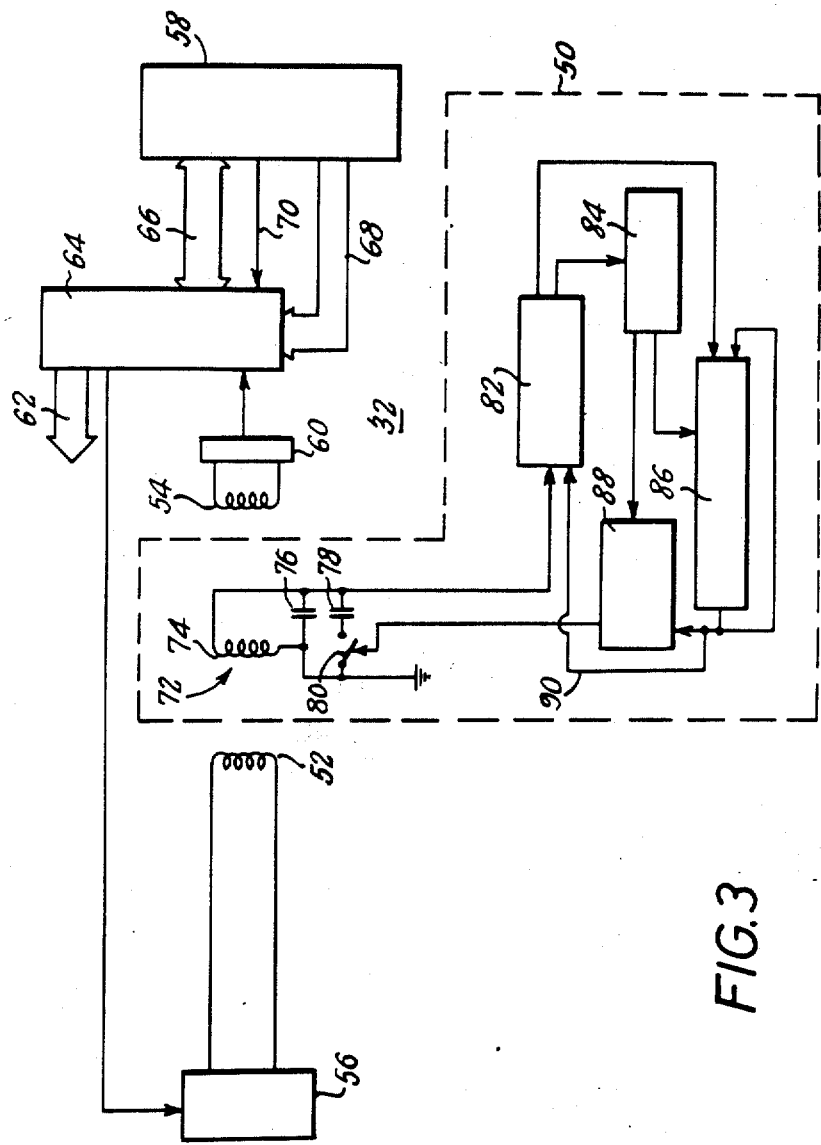
FIG. 3 is a schematic block diagram of the circuitry of the token and the testing station in a first arrangement.
Figure 4:
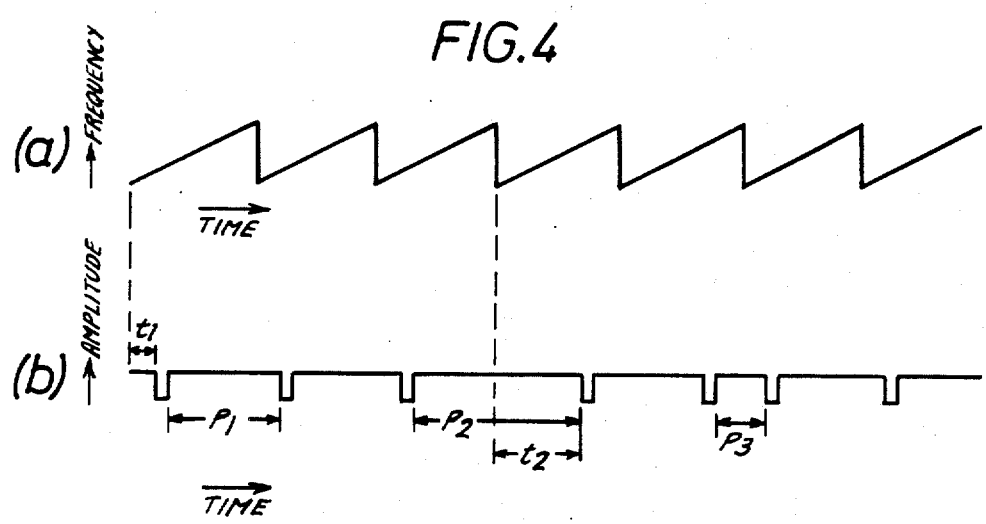
Figure 5:
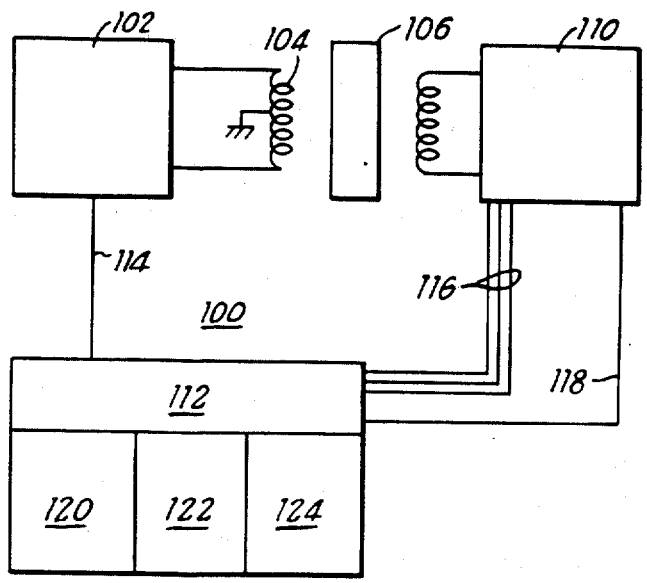
Figure 6:
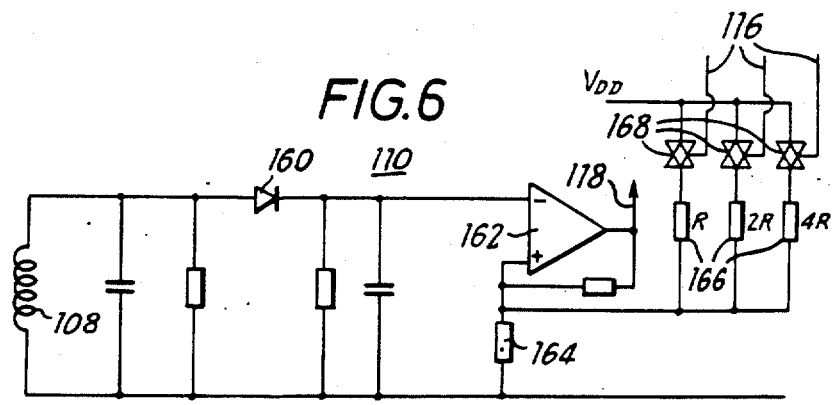
Figure 7:
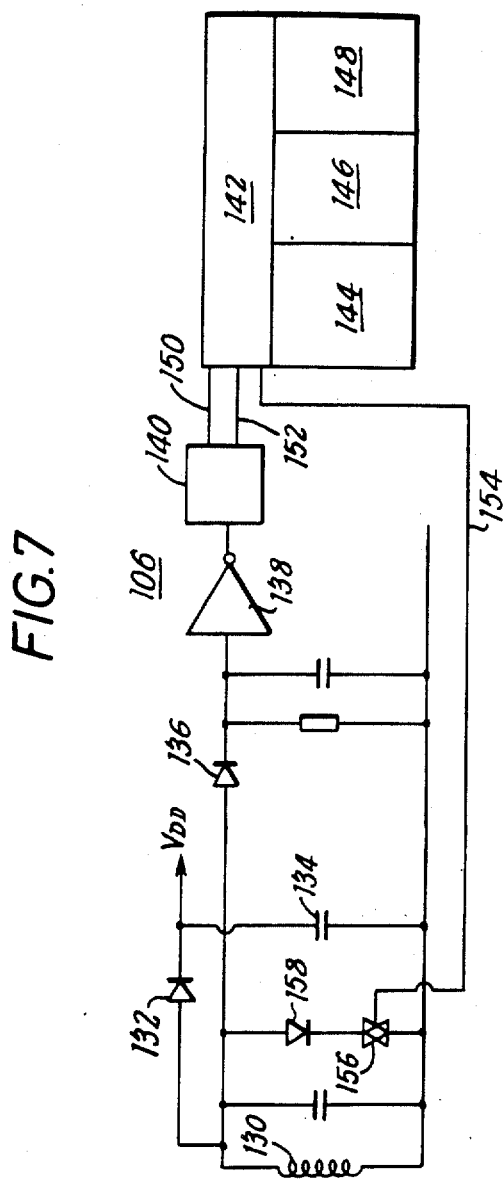

FIGS. 4(a) and (b) are waveform diagrams for illustrating the operation of the circuitry of FIG. 3;

FIG. 5 is a block diagram showing the token handling device and token in a second arrangement;

FIG. 6 is a circuit diagram of a receiver of the token handling device of FIG. 5;

FIG. 7 is a diagram of the circuitry of the token of FIG. 5; and

Figure 8:
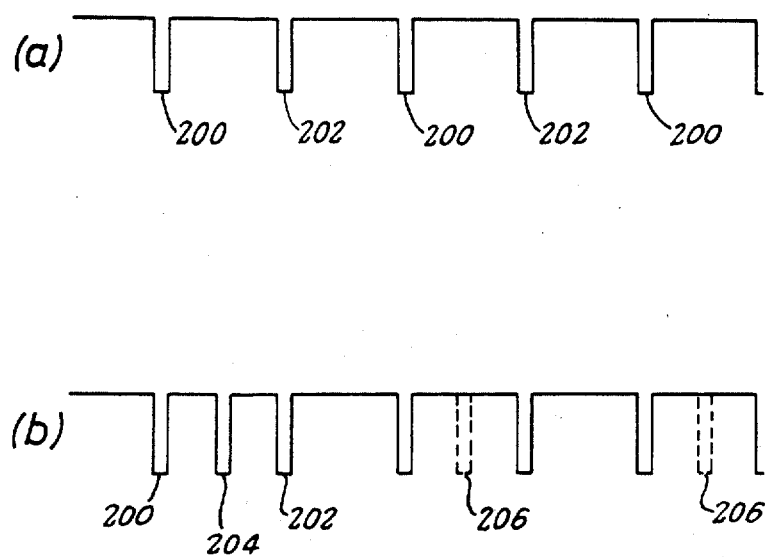

FIG. 8 shows waveforms of signals received by the receiver of the token handling device of FIG. 5.

Figure 1:
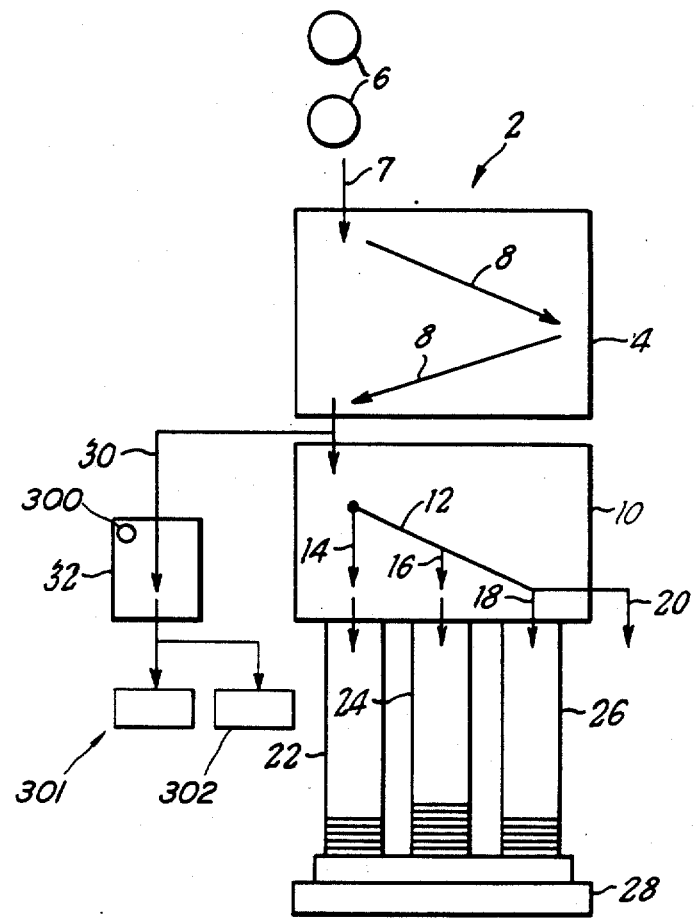
FIG. 1 is a schematic view of a coin and token handling device according to the present invention.

Referring to FIG. 1, the coin and token handling apparatus 2 includes a coin validator 4 for receiving coins and tokens as indicated at 6 travelling along a common path 7 from an entrance slot (not shown). During the passage of the coins and tokens 6 along a path 8 in the validator 4, test operations are carried out to determine whether a valid coin has been inserted, and if so the denomination of the coin. These tests are standard ones, and may for example be inductive tests.

Acceptable coins then enter a coin separator 10, which has a number of gates (not shown) controlled by the circuitry of the device for selectively diverting the coins from a main path 12 into any of a number of further paths 14, 16 and 18, or allowing the coins to proceed along the path 12 to a path 20 leading to a cashbox. If the item tested in the validator 4 is not determined to be an acceptable coin, it is delivered to a reject path 30 instead of continuing through the separator 10.

Each of the paths 14, 16 and 18 leads to a respective one of three coin containers 22, 24 and 26. Each of these containers is arranged to store a vertical stack of coins of a particular denomination. A dispenser indicated schematically at 28 is operable to dispense coins from the containers when change is to be given by the apparatus.

Whenever a validator recognises an acceptable coin, a credit count is incremented by an amount corresponding to the value of the coin. When sufficient credit has been accumulated, the device 2 produces a signal indicative of this. For example, in a preferred embodiment the device 2 is installed in a vending machine (not shown), and the signal will indicate to the vending apparatus that a user may initiate the vending of a product. The apparatus may be arranged to operate such that products can be repeatedly vended until the credit count drops to a level below the lowest of the prices of the products which the machine vends.

At any stage, the user may operate an "ESCROW" button, which terminates the transaction or series of transactions, and initiates the delivery of change of a value corresponding to the remainder of the accumulated credit, which credit is then cleared.

The arrangement described so far is quite conventional, and the details of particular structures suitable for accomplishing these functions will therefore not be described.

Figure 2:
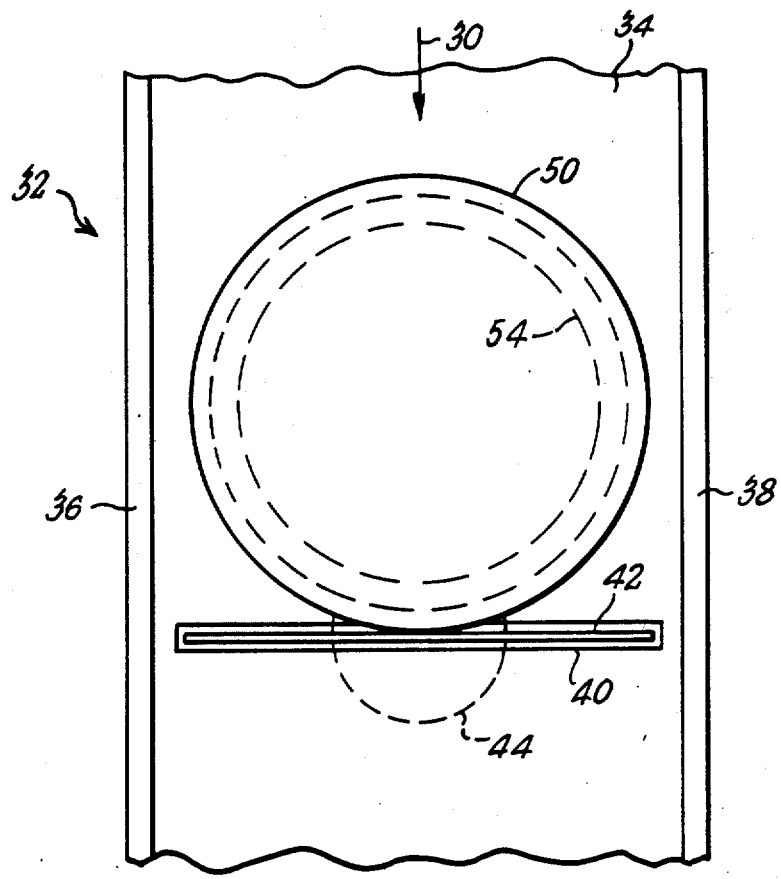
FIG. 2 shows a token in a testing station of the device of FIG. 1.

The device of FIG. 1 has, in addition to these structures, a token testing or interrogation station 32, shown in more detail in FIG. 2. This station 32 is situated along the reject path 30 so that all rejected items are delivered to the station 32 before being delivered to a reject tray for retrieval by the user.

Referring to FIG. 2, the reject path 30 extends between a rear wall 34, a front wall which is not shown in FIG. 2 to permit the interior of the interrogation station to be seen, and sidewalls 36 and 38. The rear wall 34 has an aperture 40 so that a gate 42 can be selectively thrust into and withdrawn from the path 30 by a solenoid 44.

Normally, the gate 42 is located in the path 30 so that all rejected items are stopped at the interrogation station 32. Each item is interrogated, and if it is found not to be a token, the gate 42 is withdrawn so that the item can proceed to the reject tray.

If the item is a token, it is held by the gate 42 at the interrogation station 32 until the completion of the transaction or series of transactions carried out by the user, following which the gate 42 is withdrawn so that the token is returned to the user.

FIG. 2 shows a token 50 of a preferred embodiment of the invention, which is for use with debit systems and which therefore stores data representing a particular value, which value is decremented after a transaction or a series of transactions has been carried out and before the token 50 is returned to the user.

FIG. 3 shows one example of the type of circuitry that can be used for the token and the interrogation station. It will be appreciated that many other types of circuit could alternatively be used.

The interrogation station 32 has transmission and reception coils 52 and 54, respectively. The transmission coil 52 is driven by a drive circuit 56 which is operated in response to a signal derived from a microprocessor 58. The microprocessor 58 also receives, via an input circuit 60, and processes signals from the reception coil 54, and delivers signals to the main data bus 62 of the control circuit of the coin handling mechanism. The data bus 62, input circuit 60 and drive circuit 56 are connected to the microprocessor 58 via a multiplexing circuit 64 which communicates with the microprocessor 58 via a data bus 66, an address bus 68, and a read/write signal path 70. The microprocessor 58 controls the reading of data from, and delivering of data to, the token 50, and also communicates with the main coin mechanism circuitry so as to send the token value to this circuitry and to receive therefrom the remaining value after a transaction or series of transactions has been carried out.

The main coin mechanism circuitry may be of per se known form, such as that described in published U.K. patent specification No. 2,110,862A. In an alternative arrangement, the main processor of the coin mechanism circuitry could be used to control the interrogation station directly, so that the additional microprocessor 58 would not be required.

In order to interrogate the token 50, the microprocessor 58 causes the transmitter drive circuit 56 to drive the coil 52. The circuit 56 is so arranged that the output frequency used to drive the coil 52 sweeps from a low value to a high value each time the circuit 56 is operated. The output frequency is shown in FIG. 4(a).

The token 50 includes a circuit generally indicated at 72 for selectively absorbing the energy transmitted by the coil 52. In this particular case, the circuit 72 is a resonant circuit including a coil 74 and a parallel-connected capacitor 76. A further parallel-connected capacitor 78 can be switched in and out of circuit using a semiconductor switch 80 in order to vary the resonance frequency of the circuit 72.

The energy transmitted by the transmission coil 52 is picked up by the reception coil 54, and the signal from this coil 54 is delivered to a comparator in the input circuit 60 for amplitude-detection purposes. The signal generated by the input circuit 60 is shown in FIG. 4(b). It will be noted that each time the frequency of the signal delivered to the transmission coil 52 is swept, there is a point at which the energy is strongly absorbed by the resonant circuit 72, so that a short pulse is produced in the signal generated by the input circuit 60. The precise time, within each frequency sweep, at which this pulse is produced is dependent upon the resonance frequency of the circuit 72, and can therefore be altered by operation of the switch 80.

Transmission of data from the token 50 to the interrogation station 32 is achieved by selective operation of the switch 80, for example such that a data bit "1" is represented by the absorption frequency when the switch is closed, and a data bit "0" is represented by the absorption frequency when the switch is open.

This data can be detected by the microprocessor 58 in a variety of ways. For example, the microprocessor could be arranged to note when the interval between the pulses received from the circuit 60 alters from a value P1 (see FIG. 4(b)), which is determined by the rate at which the drive circuit 56 is operated, to a value P2, which occurs when the resonance frequency has just been altered from its low value to its high value, or to a value P3, which occurs when the resonance frequency has just been altered from its high value to its low value.

Alternatively, the microprocessor could be arranged so that each time a token is received, the time t1 (see FIG. 4(b)) from the start of the frequency sweep to the time at which the circuit 60 produces a pulse is measured. During future frequency sweeps, the resonance frequency is determined to be low if the time taken for a pulse to be generated is substantially equal to t1, and is determined to be high if the time is a significantly greater value t2.

Neither of these methods relies upon the resonance frequency having specific values, so that large tolerances are permitted in the token circuitry.

Data is transmitted to the token 50 by amplitude-modulating the signal applied to the transmission coil 52. The amplitude modulated signal can either have a varying frequency, as in FIG. 4(a), or may simply have a single frequency, for example located at the midpoint of the frequency sweep.

The signal is picked up by the resonant circuit 72, which has an output connected to a detection circuit 82. The circuit 82 is operable to derive from the received waveform the data transmitted by the interrogation station 32.

The circuit 82 can detect predetermined codes which are transmitted by the station 32. Detection signals indicative of these codes are delivered to a control circuit 84. The detection circuit 82 can also detect data intended for storage in the token 50. This data is delivered to a memory circuit 86.

In the present embodiment, the memory circuit 86 is a recirculating shift register, the contents of which are shifted back into the register as they are read out.

The control circuit 84 can cause data to be read out of the memory circuit 86 and delivered to a transmission circuit 88. The control circuit 84 causes the transmission circuit 88 selectively to operate the switch 80 in accordance with the data from the memory circuit 86, so that the data is sent to the interrogation station 32.

The operation of the circuitry is as follows. When a token has been received in the interrogation station, the drive circuit 56 is operated. This is detected by the token 50, which then sends to the station 32 a predetermined code which represents a request for the interrogation station 32 to transmit a security code which the microprocessor 58 stores.

This station security code is checked by the detection circuit 82, and further operations are permitted only if the station security code is suitable for that token. This procedure, which is optional, is done to ensure that any subsequent alteration of the data in the token only takes place if the machine containing the interrogation station 32 is an appropriate one, for example one owned by a particular company. The station security code recognition operation could for example be carried out by the circuit 82 determining whether the code matches a number stored in the memory circuit 86 and received therefrom on line 90; this would enable tokens having the same circuits to be made suitable for different machines simply by altering the contents of the memory circuit 86.

Assuming that the station security code is appropriate for that token, the token then sends to the interrogation station 32 a token security code stored in the memory circuit 86. The microprocessor 58 determines whether this token security code is appropriate for that machine, and only permits subsequent transactions if the code is appropriate. This ensures that the machine cannot be operated by insertion of tokens supplied by unauthorised companies.

It will be noted that the token security code is transmitted only if the station security code has been found to be appropriate. This improves the security of the system, as it renders it difficult for unauthorised people to determine the token security code.

After the security code recognition operations, the token 50 proceeds to transmit a token value stored in the memory circuit 86. This could, if desired, be carried out only after the interrogation station 32 has first acknowledged that the token security code is appropriate.

The microprocessor 58 then sends signals to cause the credit count to be incremented by the token value. The user is then permitted to carry out transactions in the same manner as if the credit count had been incremented by the insertion of coins.

After the completion of the transaction or series of transactions, the user operates an ESCROW button 300. The device responds to this by delivering to the microprocessor 58 data representing the remaining credit. The interrogation station 32 then transmits this data to the token 50. The detection circuit 82 recognises a special code which has been added to the transmitted data, and this code causes the control circuit 84 to shift into the memory circuit 86 data from the detection circuit 82 representing the remaining credit. This data replaces the previously-stored token value. The token 50 then acknowledges receipt of the data, following which the device causes the retraction of the gate 42 and thus permits the token 50 to be returned to the user.

Tokens can be used with the device for a number of supplementary purposes. For example, by inserting in the memory circuit 86 of a token a special code in place of or in addition to the token security code, the microprocessor 58 can be caused, upon detecting this code, to enter a special mode. In this mode, the microprocessor 58 extracts from the token 50 data which is then sent to the coin mechanism circuitry to alter a list of prices stored therein. This is a convenient way of handling changes in the price of products vended by the machine.

In a similar fashion, the microprocessor 58 can be caused to enter a further mode used to change the security code which the microprocessor 58 stores, so that in future different security codes would be recognised as appropriate for use with that device. A convenient way of achieving this latter function would be for the microprocessor to enter the further mode on receiving a first token storing the special code, but to wait for receipt of a second token before actually changing its stored code. On receiving the second token, the security code stored in the microprocessor 58 is replaced by that stored in the token. This arrangement has particular value when first installing machines, because it allows all machines to be initialised by using the same token, following which each machine will be adapted for use with a particular company's tokens in response to receiving one of those tokens.

Tokens can also be used for collecting data from the device. In this case a further predetermined code is stored in the memory circuit 86, and this is recognised by the microprocessor 58 as an authorisation to transfer into the token 50 the data which is to be collected. This could for example be audit data relating to operations which have been carried out by the machine in which the device is installed.

Once the value of a debit token 50 has been reduced to zero, the token can, upon payment, have its original value re-inserted into its memory circuit 86. This can be accomplished using a machine which is similar in structure to the interrogation station 32. In this case, however, the microprocessor 58 would be arranged to deliver to the token 50 a further predetermined value, which for security purposes would be kept secret. This further value would be recognised by the detection circuit 82 and would cause subsequent data to be entered into the memory circuit 86 as the token value. The detection circuit 82 is arranged so that increased token values can only be inserted into the memory circuit 86 when this special code has been received, although of course it will permit decreased values to be entered in other circumstances.

In the arrangement described above, the token 50 is always returned to the user after a transaction or a series of transactions has been carried out. In an alternative embodiment, a gate is provided for selectively directing tokens from the interrogation station 32 either to the reject tray 301 or to a storage box 302. Under normal circumstances the token is returned to the user. However, if the token value decreases to zero, in a debit system, or if the stored account number in a credit token is invalid, the token can instead be retained in the storage box inside the machine.

Interrogation of the token and insertion of data therein is carried out in the above arrangement while the token is held at the interrogation station 32. Alternatively, interrogation could take place as the token passes through the coin validator 4. Indeed, interrogation could be carried out using components which are also used for coin validation, e.g. an inductive coil. In this case, the gate 42 can be arranged to be normally open so that all items other than valid tokens which are rejected by the coin validator 8 are delivered straight to the reject tray.

It will be noted that the token 50 operates correctly irrespective of its specific orientation within the interrogation station 32.

In the above embodiment, the input circuit 60 produces a two-level output dependent upon the amplitude of the signal received by the coil 54. This signal is then processed by the microprocessor 58. In an alternative embodiment, the circuit 60 could contain for example a phase locked loop or a monostable circuit for processing the signal from the coil 54 in order that it may deliver to the microprocessor 58 a digital signal representing the data transmitted by the token 50.

The arrangement described above involves a token which communicates using inductive techniques, and preferably using a transmission frequency in the region of about 10 MHz to 100 MHz.

It will of course be appreciated that other techniques could be used without requiring major modification of the circuitry. Low frequency radio techniques could be used, or alternatively optical communication techniques.

FIGS. 5 to 8 illustrate a modified version of the circuitry described above in connection with FIGS. 3 and 4. Although these will be described as separate embodiments, it will of course be appreciated that individual features described in connection with FIGS. 3 and 4 can be used in the embodiment of FIGS. 5 to 8, and vice versa. Referring to FIG. 5, the token handling device 100 comprises a transmitter drive circuit 102 coupled to a transmitting antenna 104. The token 106 is, in use, disposed between the transmitting antenna 104 and a receiving antenna 108. A receiver circuit 110 is connected to the receiving antenna 108.

A microprocessor 112 has an output line 114 for controlling the transmitter drive circuit 102, three output lines 116 which control the sensitivity of the receiver circuit 110 as will be described, and an input line 118 for receiving data from the receiver circuit 110. The lines 114, 116 and 118 can be connected to the microprocessor 112 via appropriate interface circuitry. The microprocessor 112 is also connected to ROM, RAM and non-volatile writable memory circuits 120, 122, and 124, respectively. The non-volatile memory circuit 124 is preferably an EAROM.

The circuitry of the token 106 is shown in FIG. 7. The token has an antenna 130 which is connected via a diode 132 to a power storage capacitor 134. The energy transmitted by the antenna 104 is half-wave rectified by the diode 132 and stored by the capacitor 134, the voltage across which is used to power the circuitry of the token 106. The received carrier is also delivered to a diode 136 which is used for a.m. demodulation purposes. Interruptions in the transmitted carrier result in pulses at the output of diode 136 which are delivered to a Schmitt inverter 138, the output of which is connected to a latch 140. The latch 140 can be read and cleared by a microprocessor 142 which has ROM, RAM and non-volatile (preferably EAROM) memory circuits 144, 146 and 148, respectively. The data is delivered to the microprocessor on line 150 and a clear pulse is delivered to the latch on line 152.

The microprocessor 142 has an additional output line 154 which can control an analog switch 156. When the switch is turned on, the terminals of the antenna 130 are shorted via a diode 158.

The lines 150, 152 and 154 would normally be connected to the microprocessor 142 via appropriate interface circuitry (not shown).

In use of this embodiment, the token handling device is arranged, upon receipt of a token 106, to cause the transmitting antenna 104 to start transmitting a carrier wave at a frequency of the order of magnitude of 100 kHz. Some of the transmitted energy will be picked up by the antenna 130 in the token 106 and used to power-up the token. Some of the remaining energy will be picked up by the receiving antenna 108.

The transmitter drive circuit 102 is so controlled as to produce interruptions in the carrier transmission. The interruptions are at regular intervals (say every 1 ms), and each lasts for, say, 3 carrier cycles. They are sufficiently short that the voltage stored across the capacitor 134 in the token 106 does not drop to an extent which would result in interference with the operation of the token circuitry.

The microprocessor 112 in the token handling device then adjusts the sensitivity of the receiver circuitry 110 using the lines 116 until the microprocessor receives on line 118 clearly defined pulses as shown in FIG. 8(a), which correspond to the interruptions in the transmitted carrier.

Adjusting receiving sensitivity in this way should be sufficient to ensure that shorting of the antenna 130 in the token 106, which results in a change in the amount of absorbed energy, will result in detectable pulses in the output of the receiving antenna 108. If desired, however, the system could be arranged so that receiver sensitivity is adjusted in response to actual operation of the switch 156 in the token 106 to ensure that the resulting pulses are detectable.

Once the receiver sensitivity has been adjusted, the token handling device starts to communicate with the token. To do this, alternate pulses 200 in the carrier wave as shown in FIG. 8(a) are used as clock pulses, while the intervening pulses 202 are used as data pulses. A data value of zero is signified by an interruption in the carrier and consequently a pulse 202, and a data value of 1 is signified by no interruption of the carrier, which will result in a missing pulse 202.

In the token 106, the microprocessor 142 repeatedly checks for a pulse in the latch 140, and upon detecting the pulse clears the latch. The period between successive pulses is measured and stored. This measured period allows the microprocessor 142 to calculate a "window" period within which the next pulse is expected.

Data transmissions to the token are always initiated by data value of 1. Accordingly, the microprocessor 142 detects the first time that a pulse does not appear in the latch 140 within the expected period. At that time, the token is able to determine which of the pulses in the succeeding train are clock pulses 200 and which are data pulses 202.

The above description outlines how data is transmitted to the token.

Data stored in the token is transmitted to the token handling device using the analog switch 156. This can be closed for a brief period between the carrier interruptions. These brief closures of the switch 156 will result in extra pulses appearing on the line 118 from the receiver circuit 110 due to the consequent increase in the energy absorbed by the token 106.

The arrangement is such that while the token handling device 100 is expecting to receive data from the token 106, it continually transmits data values of zero. The token will have previously received data from the token handling device, and therefore its operation would have been synchronized with the token handling device. Data transmissions from the token are always initiated with a start bit which is transmitted between a clock pulse 200 and a data pulse 202. The start bit is indicated at 204 in FIG. 8(b).

Further data is transmitted bit by bit in succeeding intervals between clock pulses 200 and data pulses 202, so that in these intervals an additional pulse 206 may or may not appear depending upon the data content.

In use of the system, for reliability, any data transmission in one direction could be followed by the same data being transmitted in the opposite direction to ensure a reliable and secure operation.

The token 106 stores in the memory 148 data such as security codes, token value, etc. When the token is first received by the token handling device and powered-up by the received energy, the token and token handling device communicate with each other to check security codes and thus ensure that each is suitable for use with the other. Following this operation, the microprocessor then transmits the token value to the token handling device and at the same time stores in a flag location of the memory 148 an indication that this sequence of operations has been completed.

The transmission of the carrier is then terminated, so that the token no longer receives power. This is particularly useful in a pay phone installation. At a subsequent stage when further communication with the token is required, the carrier is transmitted once more and the token powers-up. Power-up always results in the microprocessor 142 first checking the flag in the memory 148. In this case, it will determine that the preceding operations before power-down were performed to transmit the credit value to the token handling device. Accordingly, the token will now (after the security code checking operation has been carried out) wait for a new token credit value to be transmitted by the token handling device so that it can update its stored credit value.

At the end of this procedure, the microprocessor 142 resets the flag in the memory 148 so that when the token is subsequently released to the user and at a later time inserted again into a token handling device and powered-up it will behave in an appropriate manner to transmit the token value to the device.

In the above arrangement, it will be noted that the data in the token is transmitted by the connecting of a low impedance (the diode 158) across the antenna 130. The diode 158 is used to prevent problems due to back EMF generated in the antenna 130, and also to ensure that the voltage switched by the analog switch 156 is no greater than the supply voltage of that switch. It should be noted though that the alteration of the impedance connected to the antenna 130 could be achieved in some other fashion. In addition, the alteration of the degree of absorption of the electromagnetic radiation could be achieved without affecting the impedance connected to the antenna 130; for example, a separate coil could be used for this purpose.

FIG. 6 shows in detail the receiver circuit 110 of the token handling device 100. The receiving coil 108 forms part of a tuned circuit which is coupled via an a.m. demodulating diode 160 to the inverting input of an amplifier 162. The non-inverting input of the amplifier 162 receives a reference potential derived from the junction between, on the one hand, a resistor 164 connected to one power supply rail, and, on the other hand, a parallel network of resistors 166 connected via respective analog switches 168 to the other power supply rail. The analog switches 168 are controlled by the lines 116 from the microprocessor 112.

The resistors 166 have values R 2R and 4R. It will be appreciated that the reference potential delivered to the non-inverting input of the amplifier 162 will vary depending upon which, if any, of the analog switches 168 are closed. This therefore alters receiver sensitivity.

What we claim is:

1. A token handling device which performs operations in accordance with operational data stored in the device, and which is capable of communicating with a token in order to determine token data stored by the token, the device being operable to enter a first mode or a second mode in dependence upon the type of operational data, the device being operable in the first mode to perform a said operation and in the second mode to alter the operational data in a manner dependent upon said token data.

2. A device as claimed in claim 1, wherein the operational data comprises a code, the device being operable in said first mode to perform said operation on condition that said token data includes data which matches said code, and the device being operable in said second mode to alter said code in accordance with said token data.

3. A device as claimed in claim 1, wherein said operational data comprises price data, said operation performed in said first mode comprising generating a signal permitting dispensing of a product or performing of a service and generating a price signal indicative of the value of said product or service and dependent on said price data, said device being operable in said second mode to alter said price data in accordance with said token data.

4. A device as claimed in claim 3, wherein said operation performed in said first mode comprises the step of altering said token data in dependence on said price data.

5. A coin operated machine comprising:
coin validating means for testing coins and generating signals indicative of the properties thereof;
a delivery path for delivering coins to said coin validating means;
means for generating an output permitting the vending of a product or the performing of a service, said means storing operational data and being operable to generate said output in dependence on said operational data and the signals from said coin validating means; and
token reading means operable to receive tokens from said delivery path and to read data stored by said token, said token reading means being operable to generate a signal dependent on said token data for altering said operational data.

6. A machine as claimed in claim 5 wherein said output generating means is additionally operable to generate an output in dependence on said token data, whereby said machine can be operated by coins and tokens.

7. A machine as claimed in claim 6, wherein said machine vends products or performs a service and wherein said token reading means is additionally operable to update the token data in accordance with the value of the products vended by the machine or the service performed by the machine, means being provided to return said token to the user after the token data has been updated.

8. A machine as claimed in claim 5, claim 6 or claim 7, further including an accept path and a reject path, said coin validating means being operable to generate a routing signal for determining whether items received from said delivery path are directed to said accept path or said reject path;
said token reading means being disposed along said reject path.

9. A machine as claimed in claim 5, claim 6 or claim 7, wherein said token reading means is also operable in dependence upon the data stored by said token to deliver to the token, audit data concerning operations which have been carried out by the machine.

10. A coin validating and token reading device, said device comprising:
a common path for receiving and conveying items including coins and tokens;
coin validating means arranged to receive items from said common path and to determine whether said items are genuine or non-genuine coins;
a reject path and an accept path each arranged to receive and convey items from said coin validating means;
means for selectively directing items from said coin validating means to said accept path or said reject path in dependence on an output of said coin validating means; and
token reading means situated in said reject path for reading data stored by tokens delivered from said coin validating means to said reject path.

11. A device as claimed in claim 10, including means responsive to the data read from said token by said token reading means for selectively directing tokens leaving said token reading means to a first location for dispensing of the token or a second location for storage of the token.

12. A device as claimed in claim 10, wherein said token reading means comprises a reading station, means for temporarily detaining tokens at the reading station, means for estabishing communication with a token detained at said reading station, and means for releasing said token so that it may be dispensed by the device.

13. A device as claimed in claim 12, including means responsive to the data read from said token by said token reading means for selectively directing tokens leaving said token reading means to a first location for dispensing of the token or a second location for storage of the token.

14. A device as claimed in claim 12 or claim 13, wherein said means for establishing communication is operable to generate a first signal for powering up the token and thereafter to perform a first communication sequence in which data stored by said token is read, and subsequently to generate a second signal for powering up the token again and to perform a second communication sequence for updating the data stored by the token.

15. A device as claimed in claim 14, wherein, during each said communication sequence, said token and said token reading means establish two-way communication.

16. A device as claimed in claim 14, wherein said token comprises a non-volatile writable memory storing flag data determining the communication sequence to be performed by the token on power up.

17. A device as claimed in claim 10 wherein said token reading means is operable to generate a carrier signal, and to determine data stored by the token by detecting changes in the degree of absorption of the carrier signal by the token.

18. A device as claimed in claim 14, wherein said token reading means is operable during said first communication sequence to determine data stored by the token by detecting changes in the degree of absorption of said first signal by the token.

19. A device as claimed in claim 10, claim 11, claim 12 or claim 13, including a common entrance slot through which coins and tokens can be inserted into said common path.

20. A device as claimed in claim 10, claim 11, claim 12 or claim 13, wherein said token reading means includes means for updating data stored by the token.

21. A coin validating and token reading device, said device comprising first and second testing stations, one of said testing stations forming a coin validator for determining the validity of coins, and the other said testing station comprising means for reading data stored in a token;
a first, common path for receiving coins and tokens and for delivering them to said first testing station;
second and third paths for selectively receiving items from said first testing station; and
first directing means operable in response to an output of said first testing station for selectively directing items to said second or third path;
said second testing station being disposed along said second path.

22. A device as claimed in claim 21, including fourth and fifth paths for selectively receiving items from said second testing station, and second directing means for selectively directing items from said second testing station to said fourth or fifth path in response to an output of said second testing station.

23. A device as claimed in claim 21 or claim 22, including a common entrance slot through which coins and tokens can be inserted into said first path.

24. A device as claimed in claim 21 or claim 22, wherein said first testing station is said coin validator and said second testing station is said means for reading data stored in a token.

25. A device as claimed in claim 21 or claim 22, wherein said token data reading means comprises means for detaining the token at a reading station while communication between the token and the reading means is established.

26. A device as claimed in claim 21 or claim 22, wherein said token data reading means is also operable to update the data stored in the token.

27. A data-storing token comprising:
antenna means for receiving a signal generated by a token reader and for providing an output for powering said token;
a non-volatile writable memory storing flag data;
control means operable to perform a multi-stage communication operation with said token reader, said token being powered-down in an interval between the stages of the communication operation, said control means being operable upon power-up of the token to read said flag data and in dependence on said flag data to perform either (a) a first stage of said communication operation, during the course of which said flag data is altered in a first predetermined manner, or (b) a second stage of said communication operation, during the course of which said flag data is altered in a second predetermined manner.

28. A token as claimed in claim 27, including switch means for altering the impedance across said antenna means under the control of said control means in order selectively to absorb differing amounts of said output for powering said token and thereby transmit data to said token reader.

29. A token as claimed in claim 27 or 28, including means for detecting interruptions of said output for powering said token caused by said token reader and for generating a data signal dependent upon the timing of said interruptions, whereby data can be transmitted to the token by said token reader.

30. A token as claimed in claim 29, said token being operable to update the data stored in said non-volatile writable memory in accordance with data transmitted by said token reader.

31. A coin and token operated machine which is operable to perform a transaction on receipt of one or more coins or a data storing token, said machine comprising token reading means operable to perform a multi-stage communication operation with the token, said token reading means powering-up the token during each stage of said communication operation to enable communication with said token, whereby during an initial stage the token reading means can extract data from the token and during a subsequent stage the token reading means can send to the token updated data for storage thereby in a non-volatile writable memory of the token, said token being powered-down between said initial and subsequent stages.

32. A machine as claimed in claim 31, including manually operable means for initiating said subsequent stage of said communication operation.

33. A machine as claimed in claim 31 or claim 32, including means operable following the sending of the updated data to the token to return the token to a user.

34. A token reading device, said device comprising:
antenna means for transmitting a signal to a token;
signal generating means for generating and applying said signal to said antenna means, said signal generating means comprising means for selectively interrupting said signal at timings dependent upon data to be transmitted to said token; and
data detection means coupled to said antenna means for detecting changes in the degree of absorption of the signal caused by said token, thereby to detect data transmitted by the token.

35. A device as claimed in claim 34, wherein said antenna means comprises a single coil.

36. A device as claimed in claim 34 or claim 36, wherein said signal generating means is further operable to transmit clock pulses by selectively interrupting said signal at additional, regular timings, the data transmitted to the token being synchronised with said clock pulses and the data detection means being operable to detect absorption changes synchronised with said clock pulses.

37. A device as claimed in claim 34 or claim 35, wherein said signal transmitted by said antenna means is sufficient to power said token.

38. A token communication system, said system comprising:
token reading and writing means including (a) antenna means for transmitting a signal to a token, (b) signal generating means for supplying said signal to said antenna means, (c) data transmission means for selectively interrupting said signal at timings dependent upon data to be sent to said token, and (d) data detection means for detecting changes in the amount by which said signal is absorbed by said token and deriving data determined by the timings at which said changes occur; and
the token comprising (a) antenna means for receiving the signal transmitted by the antenna means of said token reading and writing means, (b) power storage means for storing power derived from the signal received by the antenna means of said token, (c) data detection means for detecting interruptions of said signal and deriving data from the timings at which said interruptions occur, (d) data transmission means for selectively altering the impedance across said token antenna means at timings dependent upon data to be transmitted to said token reading and writing means, thereby selectively to alter the amount by which said signal is absorbed by said token, (e) a non-volatile writable memory, and (f) control means for deriving from said memory data for transmission by said data transmission means of said token and for writing into said memory data determined by the data detected by said data detection means of said token.

39. A system as claimed in claim 38, wherein said memory stores flag data, said control means being operable to perform first and second communications operations each involving the communication of data with said token reading and writing means in dependence upon said flag data, said control means being operable to alter said flag data in a respective predetermined manner during each said communication operation, whereby a different said communication operation is carried out when the token is subsequently powered up.

40. A system as claimed in claim 39, wherein each said communication operation involves the sending of a first code from the token to said token reading and writing means, and the sending of a second code from said token reading and writing means to said token, subsequent communications being permitted only if the first and second codes are deemed appropriate by, respectively, the token reading and writing means and the token.

41. A coin and token operated machine, the machine comprising:

control means for initiating a transaction performed by the machine and having means for storing a credit value;

coin validation means for providing, in a coin operated mode of the device, signals to said control means to increase said credit value in response to receipt of valid coins;

token reading and writing means, said token reading writing means comprising: (a) antenna means for transmitting a signal to a token, (b) signal generating means for supplying said signal to said antenna means, (c) data transmission means for selectively interrupting said signal at timings dependent upon data to be sent to said token, (d) data detection means for detecting changes in the amount by which said signal is absorbed by said token and deriving data determined by the timings at which said changes occur, (e) means responsive to the derived data for supplying, in a token operated mode of the device, signals to said control means to increase said credit value;

said control means being operable in said token operated mode to cause said token reading and writing means to update a credit value stored in said token after said transaction has been performed; and means for dispensing a token whose stored credit value has been updated.

42. A machine as claimed in claim 44, wherein said antenna means comprises a single coil.

43. A machine as claimed in claim 41, wherein said antenna means is operable to transmit a signal which is sufficient to power-up the token, said token reading and writing means thereby being operable to power-up said token during a first communication stage in which data stored by said token is read, being thereafter operable to power-down said token, and being subsequently operable to power-up the token in a second communication sequence in order to update the data stored by said token.

44. A machine as claimed in claim 41, claim 42 or claim 43, comprising manually operable means for initiating the updating of the data stored by said token and the dispensing of said token to a user.

45. A machine as claimed in claim 43, wherein each said communication stage involves the sending of a first code from the token to said token reading and writing means, and the sending of a second code from said token reading and writing means to said token, subsequent communications being permitted only if the first and second codes are deemed appropriate by, respectively, the token reading and writing means and the token.

* * * * *

UNITED STATES PATENT AND TRADEMARK OFFICE
CERTIFICATE OF CORRECTION

PATENT NO. : 4,674,618

DATED : June 23, 1987

INVENTOR(S) : Eglise, et.al.

It is certified that error appears in the above—identified patent and that said Letters Patent is hereby corrected as shown below:

Column 18, line 20, delete "Claim 36" and insert --Claim 35--. Column 19, line 24, insert --and-- before "writing". Column 20, Claim 43, line 9, delete "44" and insert --41--.

Signed and Sealed this

Seventh Day of February, 1989

Attest:

DONALD J. QUIGG

*Attesting Officer*   *Commissioner of Patents and Trademarks*